Jan. 14, 1930.   F. DE ROY   1,743,883
RAKE CLEANER
Filed Oct. 12, 1927
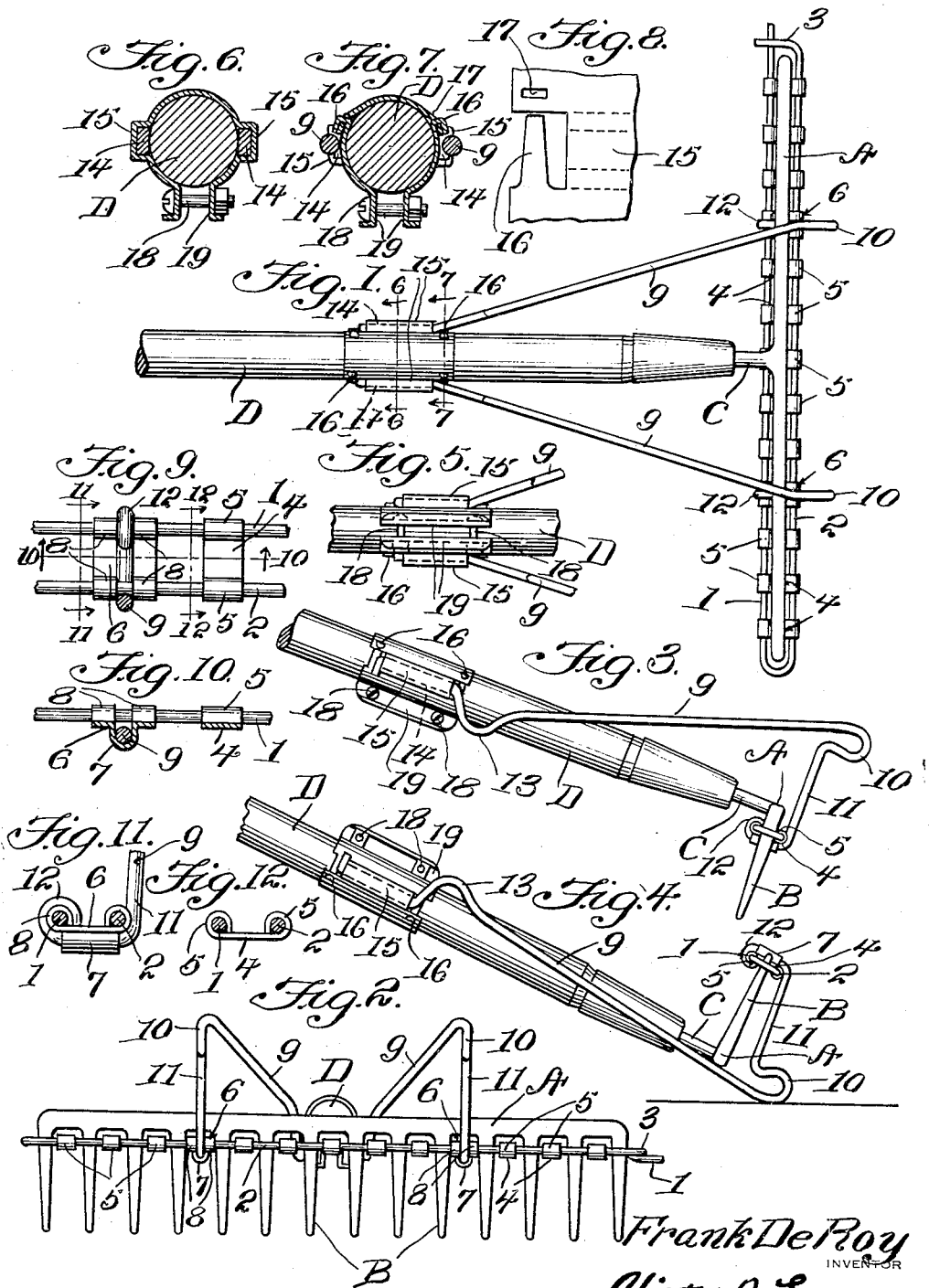
Frank De Roy
INVENTOR
BY Victor J. Evans
ATTORNEY
WITNESS: J.T.L. Wright Patented Jan. 14, 1930

1,743,883

UNITED STATES PATENT OFFICE

FRANK DE ROY, OF SEVERNA PARK, MARYLAND

RAKE CLEANER

Application filed October 12, 1927. Serial No. 225,778.

This invention relates to rake cleaners and its general object is to provide a rake cleaner that can be operated by the handle of the rake by merely applying pressure to the cleaner through the medium of the handle with the result the rake can be kept clean of material in an easy and expeditious manner with very little effort.

Another object of the invention is to provide a rake cleaner that can be made to fit rakes of various sizes and shapes.

A further object of the invention is to provide a rake cleaner of the character set forth, that is simple in construction, inexpensive to manufacture, and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a fragmentary top plan view of a rake with the cleaner forming the subject matter of the present invention applied thereto.

Figure 2 is a front elevation of the structure as shown in Figure 1.

Figure 3 is a side elevation of the rake in operative position and the cleaner in its normal position.

Figure 4 is a similar view of the cleaner in operative position.

Figure 5 is a fragmentary bottom plan view showing the clamping means for securing the cleaner to the handle of the rake.

Figure 6 is a sectional view taken approximately on line 6—6 of Figure 1 looking in the direction of the arrows.

Figure 7 is a sectional view taken on line 7—7 of Figure 1 looking in the direction of the arrows.

Figure 8 is a plan view of a portion of the blank from which the clamping means above referred to is formed.

Figure 9 is a fragmentary portion of the rake teeth receiving means.

Figure 10 is a sectional view taken approximately on line 10—10 of Figure 9.

Figure 11 is a sectional view taken approximately on line 11—11 of Figure 9 looking in the direction of the arrows.

Figure 12 is a sectional view taken approximately on line 12—12 of Figure 9, looking in the direction of the arrows.

Referring to the drawings in detail, it will be noted that I have disclosed a rake of the usual construction which includes a body A having extending therefrom in spaced parallelism with respect to each other, teeth B. The body is provided with the usual shank C which extends centrally therefrom as best shown in Figure 1 of the drawings, and the shank C is secured to the handle D through the instrumentality of a bore and sleeve connection as shown.

The cleaner includes a single piece of resilient wire bent intermediate its ends to provide parallel elongated portions 1 and 2 which are disposed upon opposite sides of the teeth, as suggested in Figure 1, and while one of the free ends of the parallel portions terminate beyond one of the end teeth, the opposite parallel portion has its end terminating in a right angle bent end 3 which as best shown in Figure 2 is disposed in overlapping relation with the free end of the other portion.

Connected with each of the portions 1 and 2 and disposed between the teeth are strips 4 having their ends curved upon themselves to provide eyes 5 for receiving the parallel portions. The strips 4 are not only adapted for the purpose of cleaning the teeth in the manner which will be presently described, but also act to retain the portions 1 and 2 in true parallel relation with respect to each other as will be apparent. The strips 4 are arranged between all of the teeth with the exception of two pair thereof, and disposed between these pairs of teeth is a clip 6 having formed upon its under side a sleeve 7 while eyes 8 similar to the eyes 5 are formed with the ends of the clip, as best shown in Figure 11. The eyes 7 also receive the parallel portions as will be noted. The parallel portions together with their strips 4 and clips 6 are arranged in spaced relation with respect to the teeth, so as to be movable thereon for cleaning the same, and in order to accomplish this movement, I have provided a pair of spring arms which are also formed from resilient wire having one of their ends fixedly secured to the handle D and from these secured ends, the arms which are indicated by the reference numeral 9 extend in divergent relation with respect to each other in an upwardly inclined manner, are thence bent to provide loops 10 for a purpose which will be presently apparent, terminate in portions 11 disposed approximately at right angles to the body of the arms and in a line substantially parallel with the teeth. These portions 11 are bent at right angles upon themselves and these right angle bent ends are received in the sleeves 7 and secured therein by further bending the same as at 12.

The loops 10 are provided for adjusting the position of the portions 11 as it will be obvious that the loops not only form a ground engaging surface for operating the cleaner in the manner as suggested in Figure 4, but will allow the portions 11 to be disposed at various distances with respect to the arms 9, so as to accommodate various sizes of teeth and therefore prevent the parallel portions 1 and 2 from being arranged beyond the operating ends of the teeth when the cleaner is operated.

The adjacent ends of the arms 9 as above set forth, are disposed in clamping engagement with the handle, and these adjacent ends are curved upon themselves as at 13 to add resilient qualities to the arms 9 and are thence flattened as at 14 to be received in square cornered projections 15 formed upon opposite sides of the clamp for securing the arms to the handle, as best shown in Figure 6 of the drawings. This clamp is provided with tongues 16 adapted to be received in slots 17 whereby the projections 15 are retained as shown. The clamp is otherwise substantially circular in cross section, and is secured to said handle through the instrumentality of bolt and nut connections 18 arranged through elongated flange ears 19. One of the ear flanges is engageable with the flat side of the nuts of the bolt and nut connections 18 so as to prevent the nuts from turning on their bolts as will be apparent.

From the above description and disclosure of the drawings, it will be obvious that the strips 4 as well as the parallel portions 1 and 2 are adapted to free the teeth D of the rake from material accumulated thereon and this is accomplished by merely reversing the position of the rake from its position as shown in Figure 3, to its position as shown in Figure 4, and applying pressure to the handle which will cause the parallel portions 1 and 2 together with their strips 4 to slide upon the teeth as suggested.

The strips 4 are mounted for frictional engagement on the parallel portions 1 and 2 and can be moved thereon so as to be accommodated in the space between teeth of various distances apart, and the parallel portions may be cut to fit various length rakes as will be apparent, but in any event the free end of one of the parallel portions is to be disposed for engagement with the free end of the other parallel portion as shown in Figure 1.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A rake cleaner of the character described comprising a single piece of wire bent intermediate its ends to provide spaced parallel portions, means secured to said portions and being adapted to be arranged between the teeth of a rake, divergent arms formed from resilient wire, a clamp for securing the adjacent ends of the arms to the handle of the rake, said arms being bent to provide loops adjacent the ends secured to the handle and also forwardly extending vertically arranged loops adjacent the opposite ends of said arms, bent portions formed with the last mentioned loops and extending at right angles therefrom, said bent portions being connected to said means, and said last mentioned loops being adapted to engage the ground for operating the cleaner and being adjustable to adjust the arms for adjusting the movement of the parallel portions with respect to the teeth.

In testimony whereof I affix my signature.

FRANK DE ROY.